May 15, 1928.

C. S. ASH 1,669,731

MOTOR VEHICLE

Filed Aug. 4, 1924

Inventor
Charles S. Ash,
By
Barthel & Barthel
Attorneys

May 15, 1928.
C. S. ASH
1,669,731
MOTOR VEHICLE
Filed Aug. 4, 1924
3 Sheets-Sheet 2
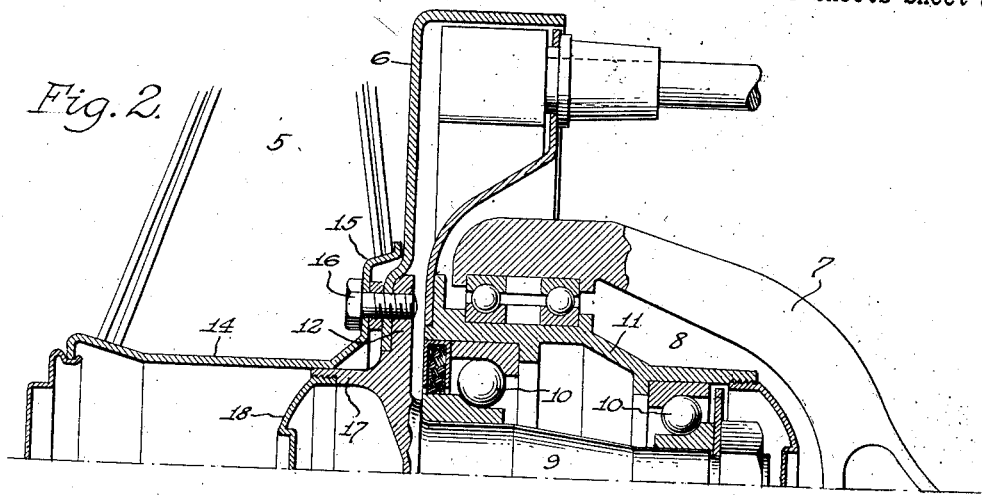
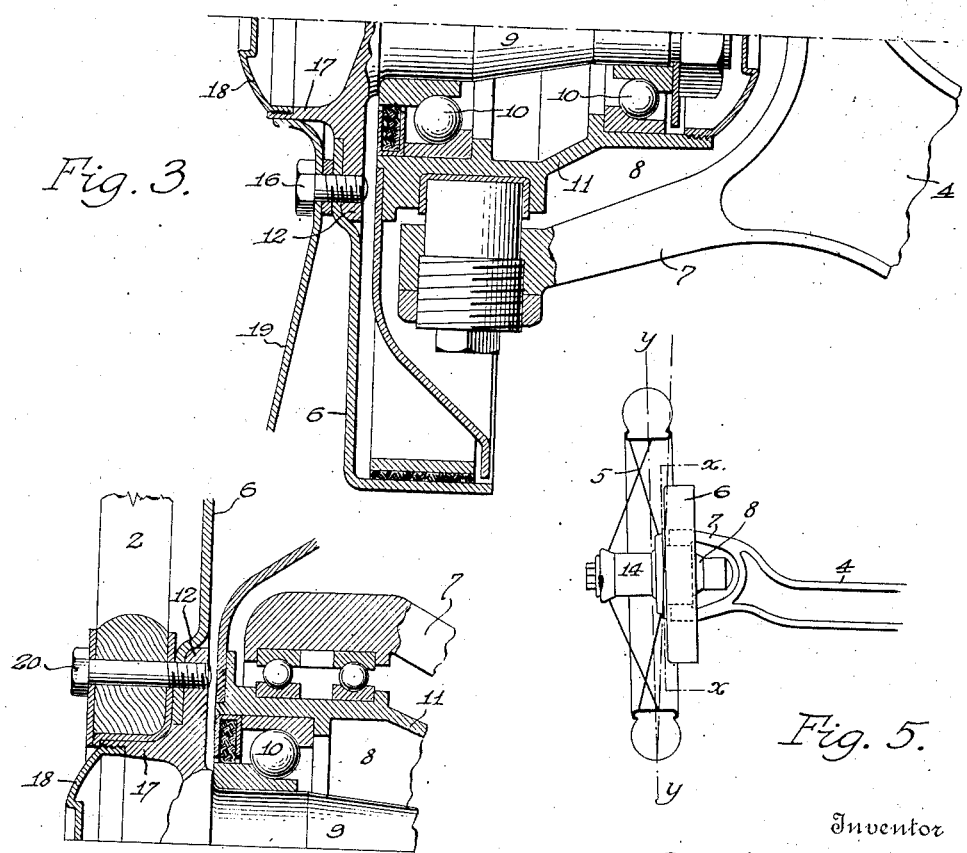
Inventor
Charles S. Ash.
By
Attorneys

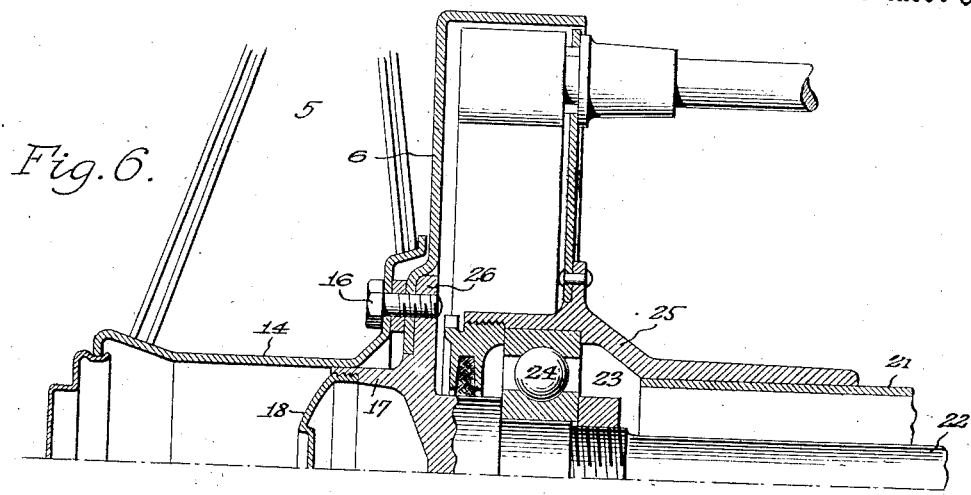
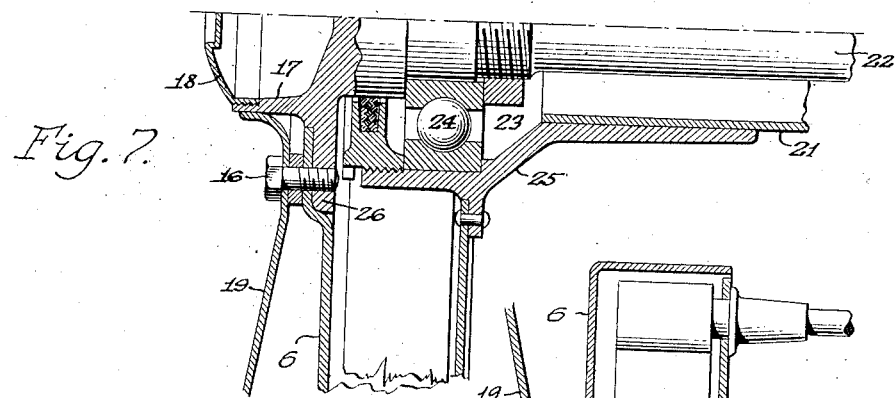
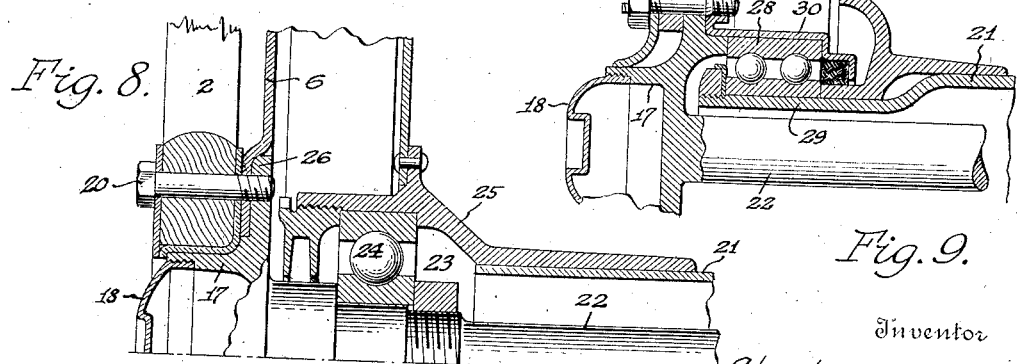

Patented May 15, 1928.

1,669,731

UNITED STATES PATENT OFFICE.

CHARLES S. ASH, OF ROYAL OAK, MICHIGAN.

MOTOR VEHICLE.

Application filed August 4, 1924. Serial No. 729,948.

In the designing of motor vehicles, axial bearings are designed according to the load and are positioned relative to the central tread or load plane of the wheel to properly carry the load, and a vehicle of standard tread is thereby produced. When wheels of the wire spoke type are substituted for wood or disk wheels, as is the common practice, such wire wheels are mounted upon the hub structure in overhanging relation to the bearings provided for such structure, and when so mounted, the central tread planes of such wire wheels do not bear the proper relation to the bearings which are thereby subjected to excessive strains. Further, because of this change in position of load or tread plane to the wheel mounting, the tread of the vehicle is increased and will not track with vehicles equipped with other types of wheels, thus subjecting the tires mounted upon these wire wheels to excessive wear, and making the steering of the vehicle difficult, this increase in tread tending also toward overloading the bearings.

An object of the present invention is to make wheels of the wood, wire and disk types readily interchangeable and without affecting the relation of the central tread plane of the wheel to the wheel mounting structure.

A further object is, complete interchangeability of the different types of wheels with all four wheels of a vehicle and without change in wheel mounting or wheel bearing structure, and this is particularly desirable in passenger car construction, for the reason that it is of great advantage to the builder of such cars to be able to furnish his customers with any desired type of wheel without the necessity for making any change in his standard hub or wheel mounting structure, and dealers are relieved from the necessity of carrying a number of different hub structures in stock. It is also desirable that the different types of wheels be interchangeable with all four wheels of the vehicle for the reason that should an accident happen to any one of these four wheels, no matter of what type they may be, any wheel of any other type which may be available, may be temporarily used.

A further object of the present invention is to provide wheels of the wire type in which the central tread or load plane is the same as in other types of wheels and has the same relation to the wheel mounting and its bearings, whereby wire wheels are made interchangeable with other types without change in vehicle tread or load conditions upon the bearings of the hub or wheel mounting structure.

Another object of the present invention is to secure such interchangeability through the offsetting laterally of the wheel rim relative to the attachment of the spokes thereto and in proportioning the number and angle of the spokes in one row relative to those of another row to properly position and support the rim and give an even distribution of strains on the spokes.

It is also an object to provide a wire wheel and mounting structure in combination which will permit of interchangeability with other types of wheels, whereby certain other new and useful results are secured, all as hereinafter more fully described and particularly pointed out in the appended claims, reference being had to the accompanying drawings, in which Figure 1 is a plan view of a motor vehicle chassis construction illustrative of the present invention;

Fig. 2 is an enlarged sectional view showing the upper half of a wheel mounting structure with a wire wheel applied thereto, and as applied to the front axle of a motor vehicle;

Fig. 3 is a sectional view similar to Fig. 2, showing a disk wheel as applied to the lower half of the wheel mounting structure shown in Fig. 2;

Fig. 4 is a sectional detail showing a wood wheel applied to the wheel mounting structure;

Fig. 5 is a diagrammatic view of a front wheel illustrative of the usual manner of mounting of such wheels and indicating the central tread or load plane of such wheels;

Fig. 6 is a sectional view similar to Fig. 2, and showing a wheel mounting structure as applied to the rear axle of the motor vehicle;

Fig. 7 is a sectional view similar to Fig. 3, showing the application to the rear axle;

Fig. 8 is a sectional view similar to Fig. 4, showing the application of the invention to a rear axle, and Fig. 9 is a sectional view showing the application of the invention to a type of rear axle known as "full floating".

Figure 1:
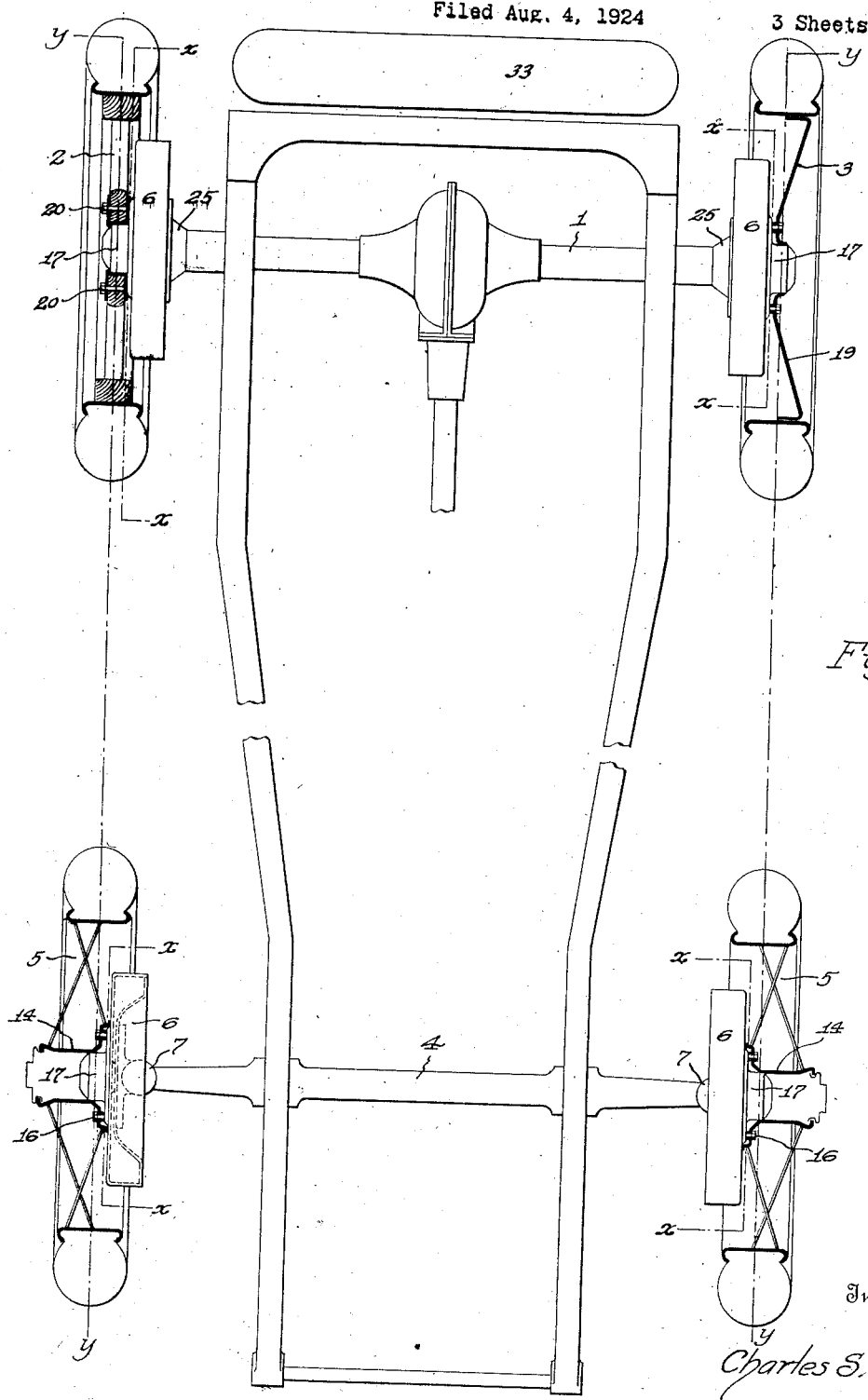

Since the advent of four wheel brakes, the problem has arisen of providing wheel and wheel mounting structures so constructed that all four wheels of the vehicle may be interchanged and made interchangeable with wheels of the wood disk or wire types, without affecting the relation of the central load or tread planes of the different types of wheels to the bearing-structures, so that undue strain will not be put upon the bearings in carrying the load, or when the brakes are applied, and also without affecting the tread of the vehicle or the application of the brakes to the front steering wheels.

In Fig. 1 of the drawings, 1 indicates a rear axle housing of the conventional form, and for the purpose of illustrating the interchangeability of wheels of different types, 2 indicates a wheel of the wood type mounted at one end of said axle, and 3 a wheel of the disk type mounted upon the opposite end of said axle. The front axle of the vehicle is indicated by the numeral 4, and as further illustrating interchangeability, wheels 5 of the wire spoke type are shown as mounted at the ends thereof, the spokes 5ª of said wheels being connected to the wheel rim 5ᵇ laterally of the longitudinal center line of the rim so that said rim will be offset inwardly a sufficient distance to bring said center line into coincidence with the central tread or load planes of the several wheels. The central tread or load planes of the several wheels, that is, the planes of the peripheral contact of the wheels with the ground, are indicated by the dotted lines y and it will be noted that this tread plane is the same in all types of wheels, being coincident with the central longitudinal planes of the rims 5ᵇ of the wire wheels, and bears the same relation or is located at the same distance from the wheel mounting or plane of attachment of said wheel to its mounting structure regardless of the type of wheel used.

Fig. 5 is a diagrammatic view of one of the front or steering wheels as attached to its axle and illustrating the manner in which such steering wheels are usally inclined to the vertical or given a pitch to facilitate steering. The load or tread plane of such inclined wheel, which plane is indicated by the dotted line y, has however, the same relation to the plane of its attachment to its mounting structure and the bearings thereof, as the rear or driving wheels to their mountings, and this plane of detachable attachment of the several wheels to their mountings is indicated in Figs. 1 and 5 by the dotted lines x.

As illustrated, all of the four wheels of the vehicle are provided with brake drums 6 which are rigidly secured to the several wheel mounting structures to rotate with the wheels, and therefore both front and rear wheels are subject to the strain of the application of brakes, which strain as applied to a front or steering wheel, subjects the bearings of its wheel mounting structures to overload, unless the wheels are properly mounted and the proper relation of load or tread plane of each wheel to such bearings, is maintained in the application of all types of wheels to these mounting structures.

In the present arrangement, all wheels, whether of the wood, wire or disk types, are detachably secured in place upon their mountings in the same manner, and all wheel mounting structures are of the same construction in that each has a single mounting flange which provides a single zone of attachment for a wheel thereto with said zone of each mounting having the same location relative to the bearings of the mounting structure, as all of the others. This central tread plane y of each of the several wheels whether of the wood, wire or disk type, also has the same location in each wheel relative to the zone of attachment x of that wheel to its mounting as all of the other wheels, and therefore all of the wheels of whatever type are made readily interchangeable without any change in construction or change in load, driving or steering strains.

To secure such relation of tread plane to zone of attachment in a wire or suspension wheel, the tire carrying rim 5ᵇ is offset laterally of the attachment of the spokes 5ª thereto, that is, their outer ends are connected to the outer half of the rim or laterally of the longitudinal center line of the rim. In wire wheel constructions the spokes 5ª are necessarily laced into the hub shell of the wheel outwardly of the zone x of the attachment of the wheel to the hub and extend outwardly to the rim in a laterally inclined position to give lateral rigidity to the wheel. Therefore, when the spokes are laced into the rim along the center line thereof as is the usual practice, the rim is offset outwardly from the standard tread plane of other types of wheels when this common construction of wire wheel is mounted upon the hub provided for such wheels, increasing the vehicle tread and subjecting the bearing of the standard hub to undue strains. In order that the tread plane of this wire wheel may coincide with the standard tread and have the same relation to its zone of attachment to the hub as to the types of wheels, the outer ends of the spokes in the present construction are laced into the outer half of the rim, with the inner half of the rim in overhanging relation to the inner end of the hub shell, to bring the center line or plane of the rim and its tire into coincidence with the tread plane y, and these spokes are so laced into the rim and the number and angle of the spokes in one row is so proportioned relative to the number and angle of the spokes in the other row or rows, that all spokes are placed under an equal strain and will therefore hold the rim concentric with the hub. This proportioning is secured by multiplying the number of spokes in one row, times the sine of the angle of lateral inclination of the spokes in that row, by the number of spokes in the other row or row, times of the sine of the angle of lateral inclination of the spokes in said other row or rows. Such proportioning will give an even tension under both radial load and lateral strains on all of the spokes, which even tension will securely hold the rim against warping or buckling and with its transverse plane parallel with the wheel axis, thereby permitting the rim to be offset laterally of the spokes, that is, the connecting of the spokes to the rim laterally of its longitudinal center line to give an offset wire wheel which may be mounted with its tread plane in the same relation to its zone of attachment to the wheel mounting, as any other type of wheel and give the same vehicle tread. Spoke tension must, however, be substantially the same in all spokes to permit such offsetting of the rim of a suspension wheel, but any type of spoke lacing, such as radial or tangential, may be employed.

In Fig. 2 a construction of front wheel mounting structure and wire wheel constructed as described detachably mounted thereon, is shown as illustrative of one form of structure suitable for carrying out the present invention, and Fig. 3 is illustrative of a similar structure with a disk wheel mounted thereon. In the construction shown, 7 indicates the arms of the forked end of the axle 4 between which arms a wheel mounting structure indicated as a whole by the numeral 8 is pivotally supported to turn upon an axis transverse to the axle which axis is vertical or inclined slightly from the vertical where it is desired that the front wheels have a pitch. This wheel mounting structure comprises a stub shaft or spindle 9 mounted in suitable anti-friction bearing 10 carried within a shell 11 which is pivotally supported between the ends of the forks 7 by any means usually employed for the purpose, so that said shell and its contained spindle may turn upon an upwardly extending axis in steering the vehicle. Upon the outer end of the spindle 9 is a radially extending flange 12 to which, in the particular construction shown, a brake drum 6 is secured. This flange also serves as a mounting or place of attachment for the wheel to be mounted thereon, and when a wire wheel 5 is so mounted, the hub shell 14 of such wheel is preferably formed with a flange 15 at its inner end having a series of openings therein to receive bolts 16 by means of which said shell flange is drawn toward the flange 12 to firmly and detachably secure the wheel to said mounting flange. This flange 12 therefore provides a single place of attachment for the wheel and takes the load, driving and braking strains, the plane $x$ of this attachment being located in the designing of the mounting structure in the proper relation to the bearings 10, and said bearings being of the proper size and arrangement to take these strains without being subjected to overload. All wheels of the wire type are designed so that the central tread plane $y$ of these wheels will be the proper distance from this plane of attachment and therefore from the bearings which will not be subjected to overload or the tread of vehicle changed in changing to wire wheels. The maintaining of standard tread and relation of tread plane to zone of attachment is particularly necessary in the application of wire wheels to the front steering wheels of the vehicle. Preferably, a longitudinally projecting annular flange 17 is provided at the outer end of the spindle 9 to serve as a guide in placing the wheel, but this flange does not function as a seat for the hub shell 14 or support the wheel, all driving and torsional strains being taken by the flange 12. A cap 18 may be secured to the outer end of this flange 17 to provide a finish for the bearing structure, and a center hub cap for the wheel when a wood or disk wheel is mounted in place of the wire wheel.

In Fig. 3 the mounting structure is the same as in Fig. 2, a disk wheel being shown as mounted thereon for the purpose of illustrating that this type of wheel is applicable to the same structure and in the same manner, said disk portion 19 of the wheel 3 being provided with a series of openings to receive the bolts 16 for detachably securing the disk to the mounting flange 12.

In Fig. 4 the same mounting structure is shown as in Figs. 2 and 3, but a wood wheel is shown as mounted thereon for the purpose of showing interchangeability and application of such a wheel to such mounting without change in mounting structure or manner of detachably securing the wheel in place thereon, said wheel 2 being provided with a series of openings at the hub ends of its spokes to receive bolts 20 similar to the bolts 16, except that they are of greater length, for drawing said wheel into firm engagement with the mounting flange 12 of the wheel mounting structure. As illustrated by the dotted line $y$ in Fig. 1, the central tread plane of this wood wheel is also located at the same distance from said zone of its attachment to the mounting structure and bearings thereof as is the tread plane of the other types of wheels.

In Fig. 6, a wire wheel of the construction illustrated in Fig. 1 is shown as applied to a rear or driving axle, the hub portion only of such wheel being shown in this figure, said axle comprising the usual fixed tubular casing 21 and inner live or driving shaft 22. The wheel mounting structure of this rear axle is modified in the usual manner to suit the conditions, and in the illustration is of the semi-floating type, it being understood that any desired type of support may be provided by suitably modifying the mounting structure in the usual manner, in this figure, the structure indicated as a whole by the numeral 23, comprising a suitably formed end portion on the shaft 22 to provide a seat for an anti-friction bearing 24 which is interposed between said seat and an enlarged end or casing 25 on the axle housing 21. The outer end of the shaft 22 is formed with a radially extending annular flange 26 similar to the flange 12, forming a place of attachment for the brake drum 6, and the wheel hub-shell 14 of the wire wheel 5 is detachably secured to said flange by the bolts 16, the same as the front wheels are secured, and the wheel is constructed the same as the wire wheels shown in Fig. 1 to bring the central tread plane of the wheel at the same distance from the zone of attachment of said wheel to its mounting flange as in the mounting of the other wheels.

The construction shown in Fig. 7 is the same as that shown in Fig. 6 but for the purpose of showing interchangeability, a disk wheel is shown as mounted upon this rear axle, wheel mounting structure, by the same means and in the same manner in which the wire wheel is mounted thereon.

In Fig. 8 a wood wheel 2 is shown mounted upon the rear axle wheel mounting structure 23 and the central tread plane of this wood wheel when so mounted bears the same relation to its zone of attachment to and bearings of the mounting structure, as all of the other wheels, said wheel being detachably secured in place in the same manner and by the same means as shown in Fig. 4.

In Fig. 9 a type of axle known as "full floating" is shown, the wheel mounting structure being changed accordingly by providing a bearing 28 therefor to take the load, said bearing being mounted upon a reduced end portion 29 of the rear axle casing 21 between said reduced end portion and a sleeve 30 which is secured to and turns with a flange 31 extending radially from the end of the driving shaft 22, said flange being similar to the flange 26 of the structure shown in Figs. 6 and 7 and provided with openings to receive the bolts or studs 32 for detachably holding a wheel to said flange. A wheel of either the wood or disk type may therefore be mounted upon this type of mounting structure and the central tread plane of the wheel of whichever type employed, will have the desired fixed relation to its plane of mounting upon said flange and also to the bearing of said mounting structure. Obviously, any desired form of mounting structure may be employed which will provide a single plane of attachment for a wheel thereto, which plane is in definite and proper relation to the bearing or bearings of said structure, and by providing wire wheels of the construction shown in Fig. 1 having their central load or tread planes at the proper distance from the plane of attachment of the wheel to its mounting, they may be readily interchanged and interchanged upon all four mounting structures of the axles. A spare wheel 33 shown in Fig. 1 with a suitably inflated tire thereon may therefore be carried and substituted for any one of the four wheels of the vehicle without change in wheel or mounting structures and with a minimum expenditure of time and effort, it only being necessary to remove the bolts which secure the wheel to the mounting flange, remove the wheel, slip the spare wheel in its place and replace the bolts, the flange of each of the four mounting structures providing a single zone of attachment of the wheel thereto, and said bolts or studs forming the sole securing means for demountably holding each wheel in place and for drawing the adjacent wheel part into strong frictional engagement with its mounting flange, all torsional driving and load strains being taken by such frictional engagement of said wheel parts with said mounting flanges. Other changes in the constructions shown and arrangement of parts may also be made within the scope of the appended claims without departing from the spirit of the present invention, and I do not therefore, limit myself to the arrangement and constructions shown.

Having thus fully described my invention, what I claim is:—

1. A wheel including a hub member, and a rim member, and two separate annular groups of spokes forming the sole connection between said members, all of the spokes of one group being connected at their outer ends to the rim member at the central longitudinal portion of said member and all of the spokes of the other group being connected at their outer ends to the rim member laterally and outwardly of the central longitudinal portion of the rim member.

2. A wheel including a hub member and a rim member, and two separate annular groups of spokes forming the sole connection between said members, all of the spokes of one group being connected to the rim member at the central longitudinal portion of the rim member at their outer ends and at their inner ends to an outer portion of the hub member, and all of the spokes of the other group being connected to the rim member laterally and outwardly of the central longitudinal portion of the rim member at their outer ends and at their inner ends to an inner portion of the hub member, with the spokes of one group crossing the spokes of the other group intermediate the ends of the spokes.

3. A wire wheel for detachable mounting upon a wheel hub structure, said wheel including a hub shell, a rim and two separate annular groups of wire spokes forming the sole connection between said shell and rim with the outer ends of all of said spokes in one group connected to the rim laterally outward of the central longitudinal portion of the rim and at their inner ends to the inner end portion of the shell, the outer ends of all of the spokes of the other group being connected to the rim at the central longitudinal portion of the rim and at their inner ends to the outer end portion of the shell, the spokes of one group crossing the spokes of the other group intermediate the ends of the spokes and all of the spokes being inclined laterally of the wheel to give lateral rigidity.

In testimony whereof I affix my signature.

CHARLES S. ASH.